United States Patent [19]

Suzuki

[11] Patent Number: 5,486,746
[45] Date of Patent: Jan. 23, 1996

[54] POSITIONING RULE STOPPER APPARATUS IN A NUMERICAL CONTROL ROUTER

[75] Inventor: Nobuyoshi Suzuki, Shizuoka, Japan

[73] Assignee: Heian Corporation, Shizuoka, Japan

[21] Appl. No.: 140,583

[22] Filed: Oct. 20, 1993

[30] Foreign Application Priority Data

Oct. 20, 1992 [JP] Japan .................................. 4-306514

[51] Int. Cl.$^6$ ..................................... B23Q 1/18
[52] U.S. Cl. ......................... 318/569; 364/474.02; 408/12
[58] Field of Search ................................ 408/12, 3, 67; 318/567–578; 364/474.01–474.03, 474.06, 474.2

[56] References Cited

U.S. PATENT DOCUMENTS

| | | | |
|---|---|---|---|
| 4,313,478 | 2/1982 | Suzuki | 144/1 A |
| 5,100,270 | 3/1992 | Dowdle et al. | 409/132 |
| 5,326,200 | 7/1994 | Suzuki | 409/137 |
| 5,333,370 | 8/1994 | Suzuki | 29/563 |

FOREIGN PATENT DOCUMENTS

| | | |
|---|---|---|
| 4173201 | 6/1992 | Japan . |
| 4173202 | 6/1992 | Japan . |
| 4201401 | 7/1992 | Japan . |

*Primary Examiner*—Brian Sircus
*Attorney, Agent, or Firm*—Burgess, Ryan & Wayne

[57] ABSTRACT

A positioning rule stopper apparatus used use in a numerical control router, includes a supporting bed; first and second rails mounted on the bed at right angles to each other; a head structure including a process head having a motor with a rotary shaft on which a tool can be fixed; a suction table with short and long outer sides, mounted on the second rail for holding a sacrifice board and a process board thereon; a first stopper holder fixed to the bed at one short outer side of the suction table; first rule stoppers for the sacrifice and process boards in common; first cylinders mounted on the first stopper holder for moving the rule stoppers to position short sides of the sacrifice and process boards with respect to the suction table; first confirming contact limit switches for confirming the position of the short sides of the boards; a second stopper holder fixed to the bed at one longer outer side of the suction table; second and third rule stoppers for the sacrifice board and process board, respectively; second and third cylinders alternatively slidably mounted on the second stopper holder at different heights for moving the second and third rule stoppers to position long sides of the sacrifice and process boards with respect to the suction table; and second and third confirming contact limit switches engaged with the second and third rule stoppers for confirming the position of the long sides of the sacrifice board.

3 Claims, 7 Drawing Sheets

5,486,746

POSITIONING RULE STOPPER APPARATUS IN A NUMERICAL CONTROL ROUTER

BACKGROUND OF THE INVENTION

The present invention relates to a positioning rule stopper apparatus in a numerical control router having rule stoppers on two sides of a suction table.

In the prior art numerical control router, as shown in FIG. 1, rule stoppers B are fixed at two sides of a suction table A. After a sacrifice board C is positioned by contacting two sides of the sacrifice board C with rule stoppers B, a process board E is positioned by rule stoppers D fixed on the sacrifice board C.

In such numerical control router, when the sides of the process board E are processed, since the rule stoppers D interfere with the movement of the tool, the rule stoppers D are movable and are removably by hand after the process board E are set on the sacrifice board. Because the rule stoppers B and D protrude on the table A and the sacrifice board C, after the process board E is processed, small pieces and chips of wood on the sacrifice board C and the process board E cannot be collected. Also, when a complex process of the process board is executed, the rule stoppers B on the table A are obstructive and the tool (a spindle of a main shaft) collides with the rule stoppers B of the table A with mistaken operation and mistaken programming. Thus, there is the danger that the tool is broken.

SUMMARY OF THE INVENTION

It is, therefore, the primary object of the present invention to provide a positioning rule stopper apparatus in a numerical control router having rule stoppers which can be moved for precisely positioning a sacrifice board and a process board.

It is another object of the present invention to provide a positioning rule stopper apparatus in a numerical control router in which rule stoppers are separated from a table.

In order to accomplish the above and other objects, the present invention comprises a head structure provided with a process head having a main shaft motor with a rotary shaft for fixing a tool of a drill or cutter, the head structure being moved on a first rail which is provided with a supporting bed, a suction table on a second rail which is provided with the supporting bed, for holding a sacrifice board and a process board which is moved at a right angle to the movement of the head structure, two or more rule stoppers severally moved by cylinders for positioning one side of a sacrifice board and a process board, contact confirming limit switches which are mounted on the rule stoppers and a stopper holder fixed to the supporting bed at one short outer side of the suction table, a plurality of rule stoppers severally moved by cylinders for positioning the other sides of a sacrifice board and a process board and contact confirming limit switches which are fixed on the rule stoppers at one long outer side of the suction table.

DESCRIPTION OF THE PREFERRED EMBODIMENTS

Figure 1:
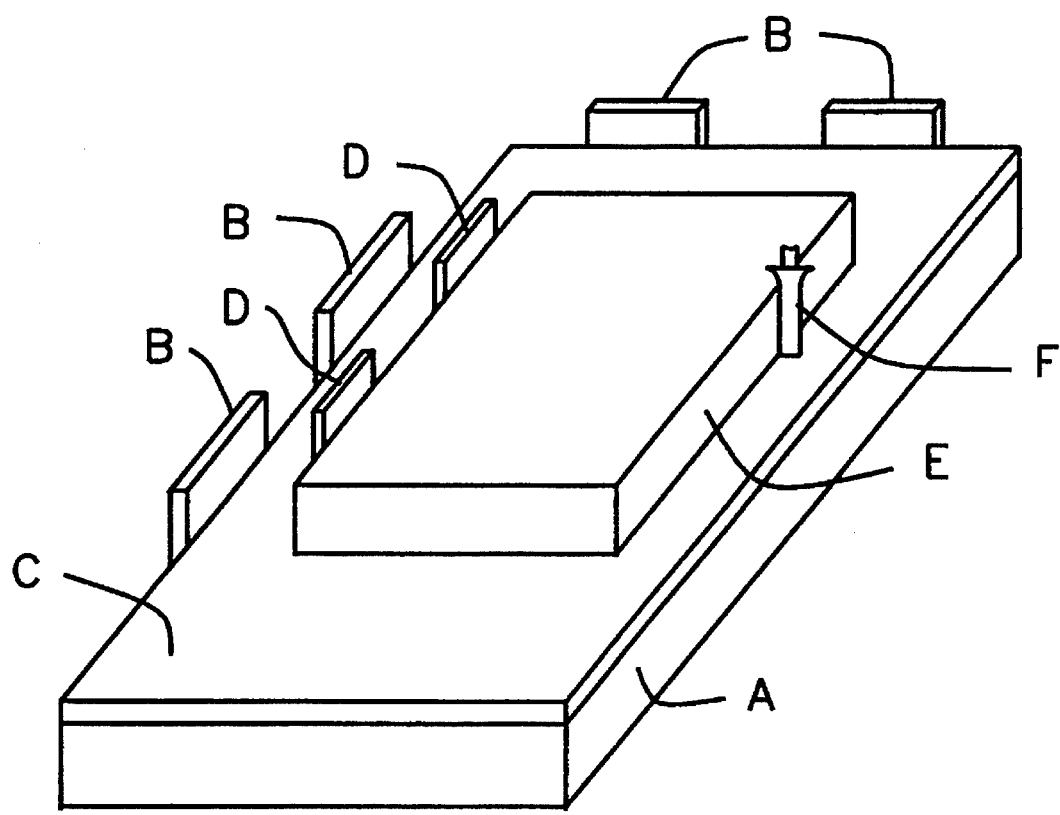
FIG. 1 shows a perspective view of a table according to prior art.
Figure 2:
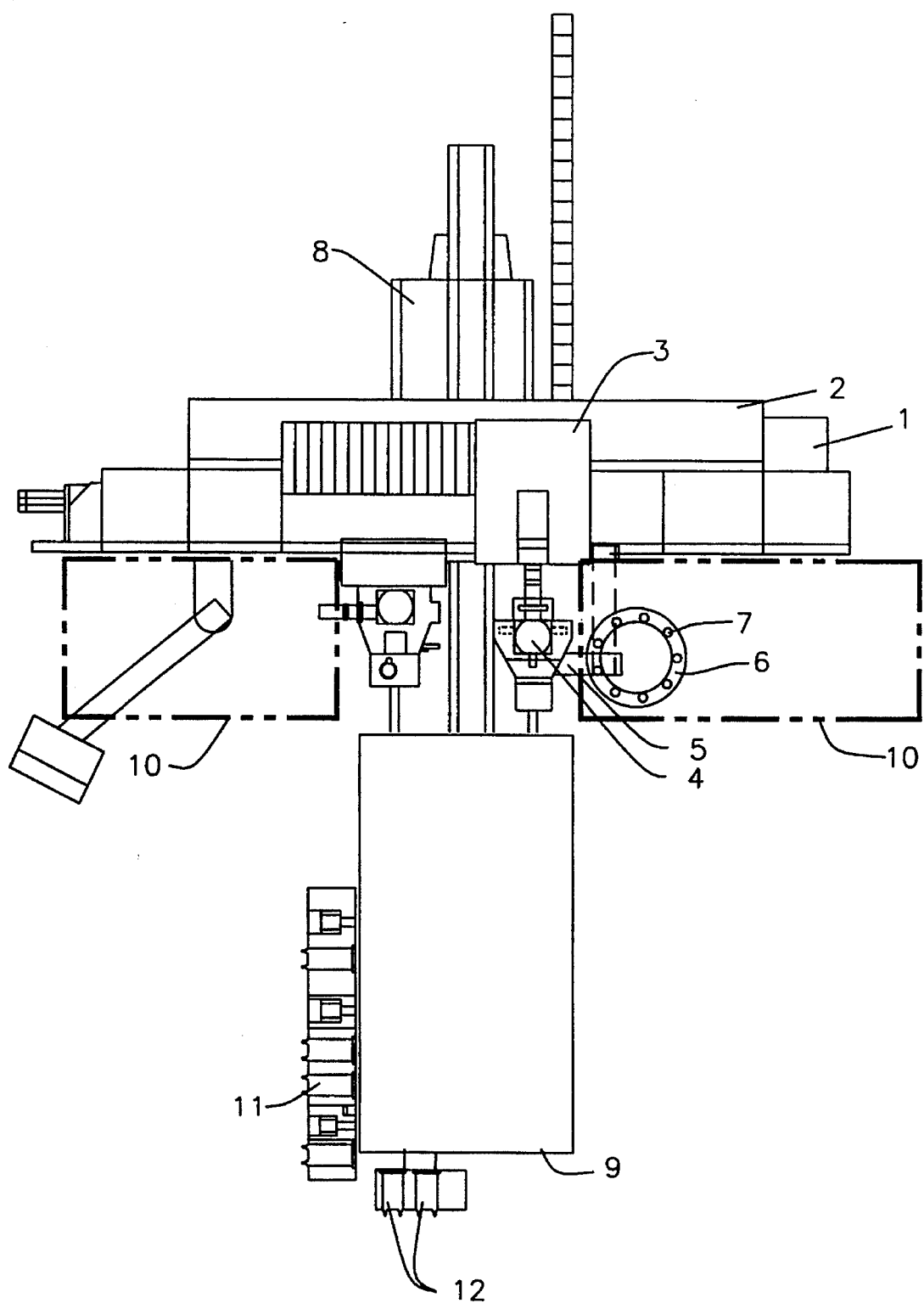
FIG. 2 shows a plane view of the numerical control router according to the present invention.
Figure 3:
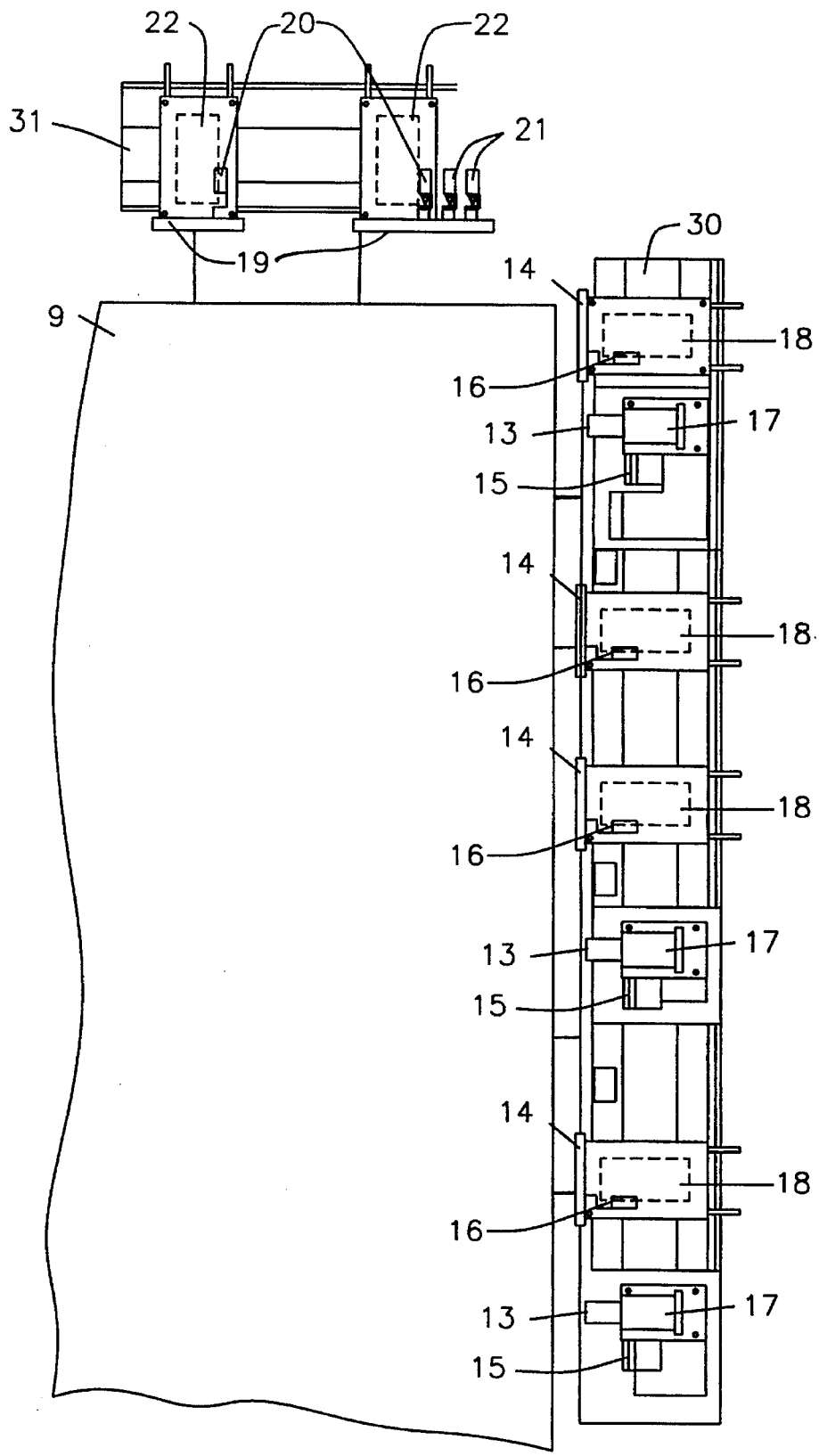
FIG. 3 shows an enlarged plan view of one part of a suction table having the rule stopper apparatus in FIG. 2.
Figure 4:
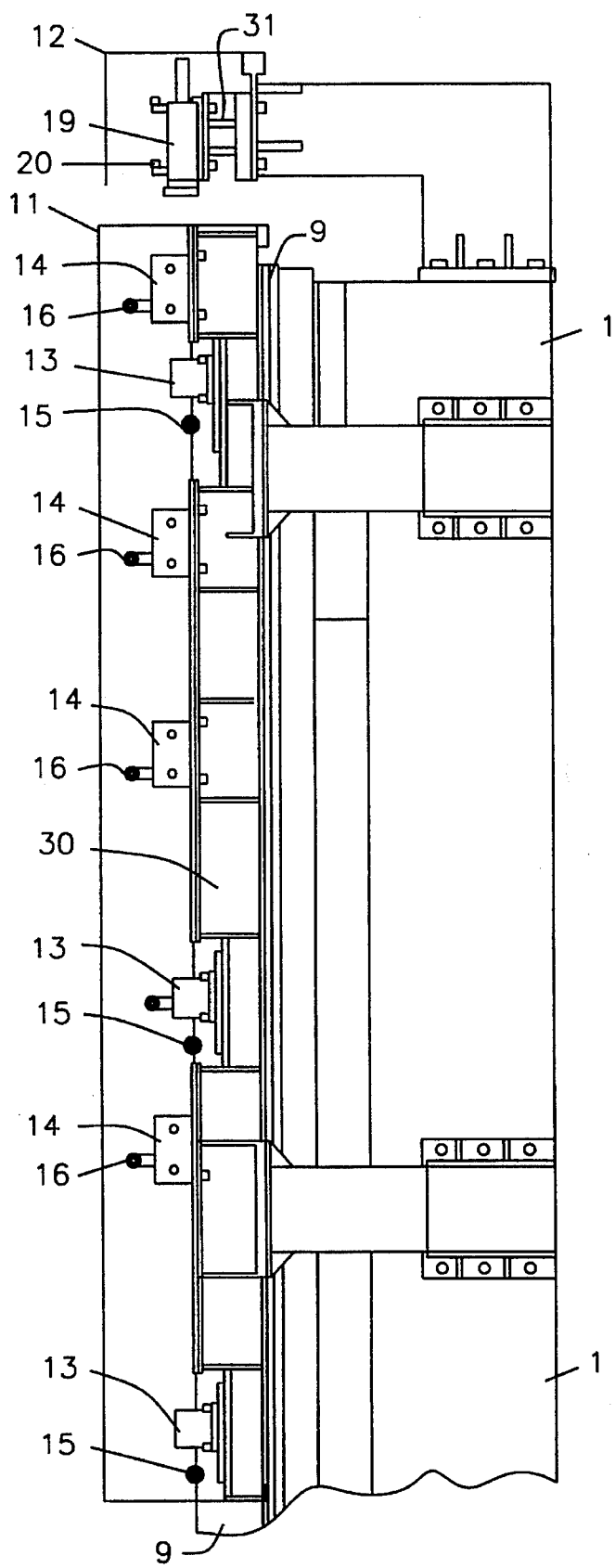
FIG. 4 shows a side view of the rule stopper apparatus in FIG. 2.
Figure 5:
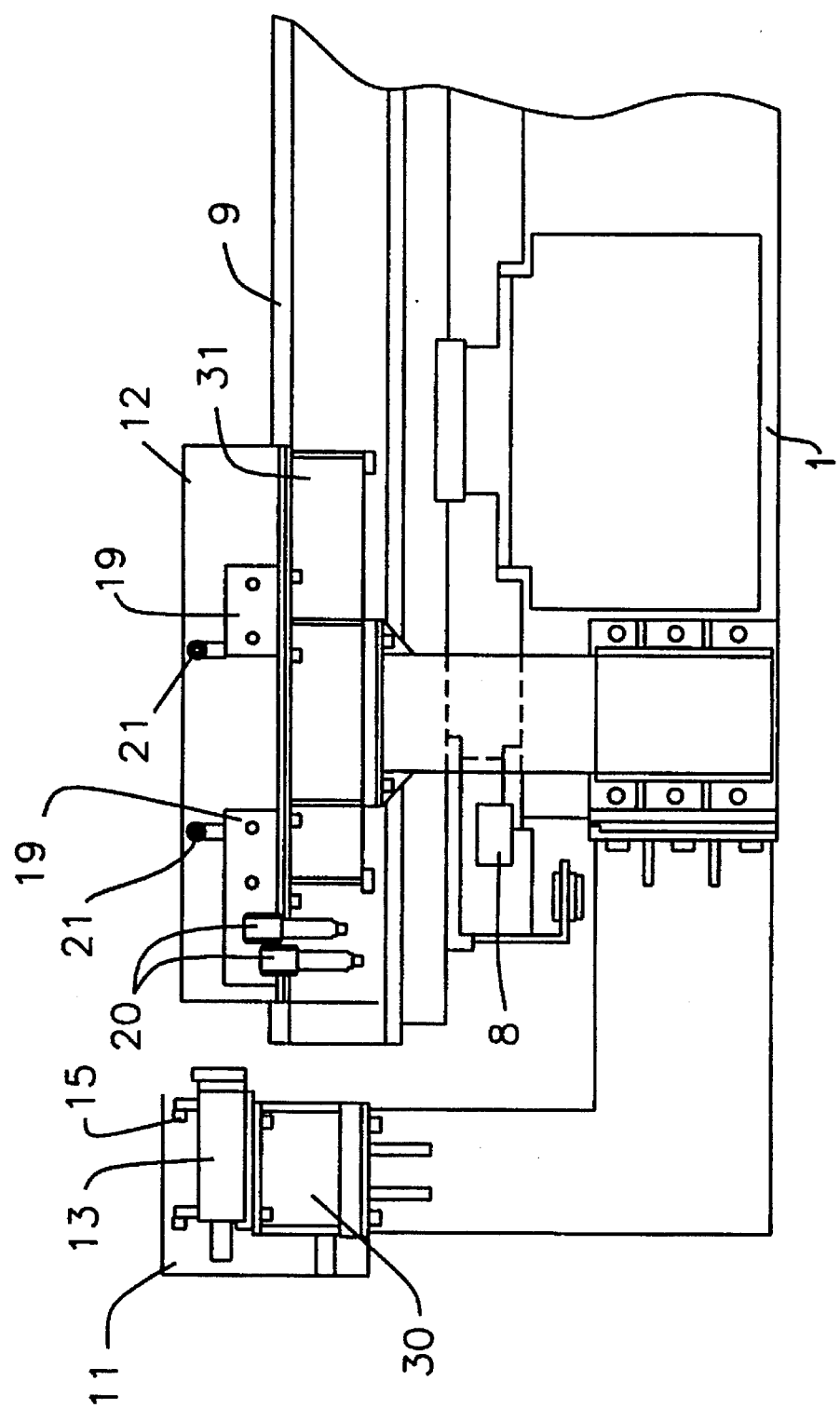
FIG. 5 shows a front view of the rule stopper apparatus in FIG. 2.

In the numerical control router in FIGS. 2, 3 and 4, a rail 2 is attached with a supporting bed 1, and a head structure 3 is mounted on the rail 2 to move left and right in FIG. 2. A head 4 is attached to the head structure 3 to move up or down, motors are provided with the process head 4 and a tool such as a drill or cutter is attached the rotary shaft of the motor.

A tool changer 5 and a tool magazine 6 having a plurality of tools 7 are attached to the side portion of the process head 4 and safety fences 10 are attached at both sides of the head. Rails 8 are attached to the supporting bed 1 under the head 4 and a suction table 9 is mounted on the rails 8 to move before and behind the head 4.

Rule stopper apparatuses 11 and 12 are attached to the supporting bed 1 at short and long outer sides of the suction table 9 and a sacrifice board and a process board put on the suction table 9 are positioned by these rule stopper apparatuses 11 and 12.

The rule stopper apparatus 11 has three rule stoppers 13 for positioning the sacrifice board and four rule, stoppers 14 for positioning the process board, which are mounted on a stopper holder 30 apart from the suction table 9, contact confirming limit switches 15 and 16 are fixed on the rule stoppers 13 and 14, the rule stoppers 13 and 14 are moved by cylinders 17 and 18 near the long edge of the suction table 9, and the sacrifice board and the process board can be positioned at the edge of the suction table 9.

The rule stopper apparatus 12 has two common rule stoppers 19 for positioning the sacrifice board the process board and contact confirming limit switches 20 for confirming the position of the sacrifice board and which are mounted on a stopper holder 31, and contact confirming limit switches 21 for confirming the position of the process board and attached to the two rule stoppers 19. Then, the rule stoppers 19 and contact confirming limit switches 20 and 21 are moved by cylinders 22 attached to the rule stoppers 19 to the edges of the suction table 9.

In the positioning rule stopper apparatus in the embodiment, after the rule stoppers 13 of the rule stopper apparatus 11 are moved by the cylinders 17 to the long edge of the suction table 9 and the common stoppers 19 are moved by the cylinders 22 to the short edge of the suction table 9, when the sacrifice board is carried on the suction table 9, the contact of the sacrifice board is confirmed by the contact confirming limit switches 15 and 20 and the sacrifice board is positioned and vacuum held on the table 9.

When the sacrifice board is positioned on the suction table 9, the rule stoppers 13 and common rule stoppers 19 are returned to the original position. Next, after the rule stoppers 14 for positioning the process board are moved to the long edge of the table 9 and the rule stoppers 19 are moved to the short edge of the table 9, when the process board is carried on the sacrifice board, the contact of the process board is confirmed by the contact confirming limit switches 15 and 21 and the process board is positioned on the table 9.

As stated above, after the sacrifice board is positioned on the table 9, the process board is positioned on the sacrifice board by contacting the rule stoppers 13, 14 and 19. If the lengths of the sacrifice board and the process board are different respectively, the rule stoppers 13 and 14 can position the sacrifice board and the process board.

Figure 6:
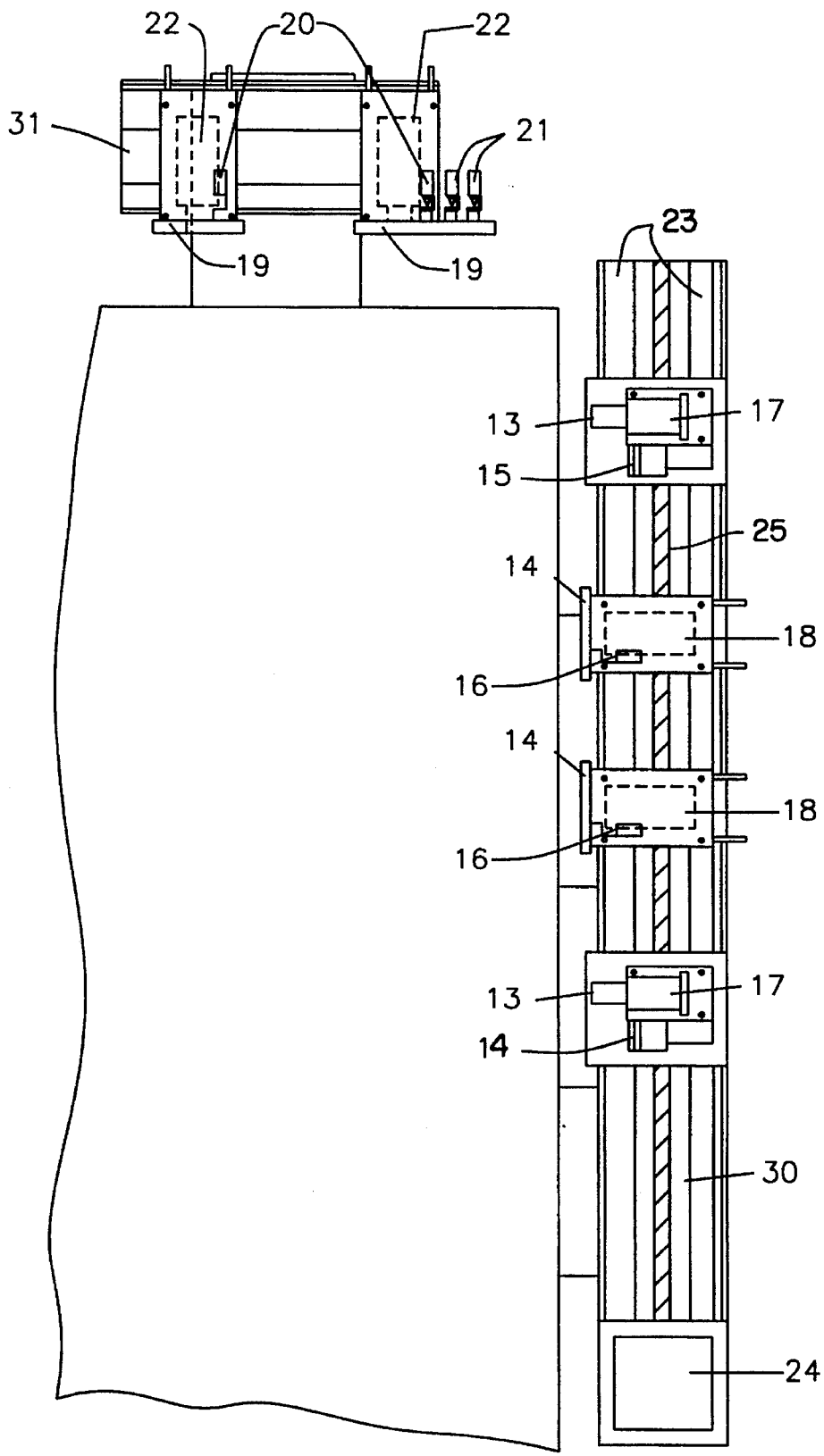
FIG. 6 shows a plane view of the rule stopper apparatus of another embodiment according to the present invention.
Figure 7:
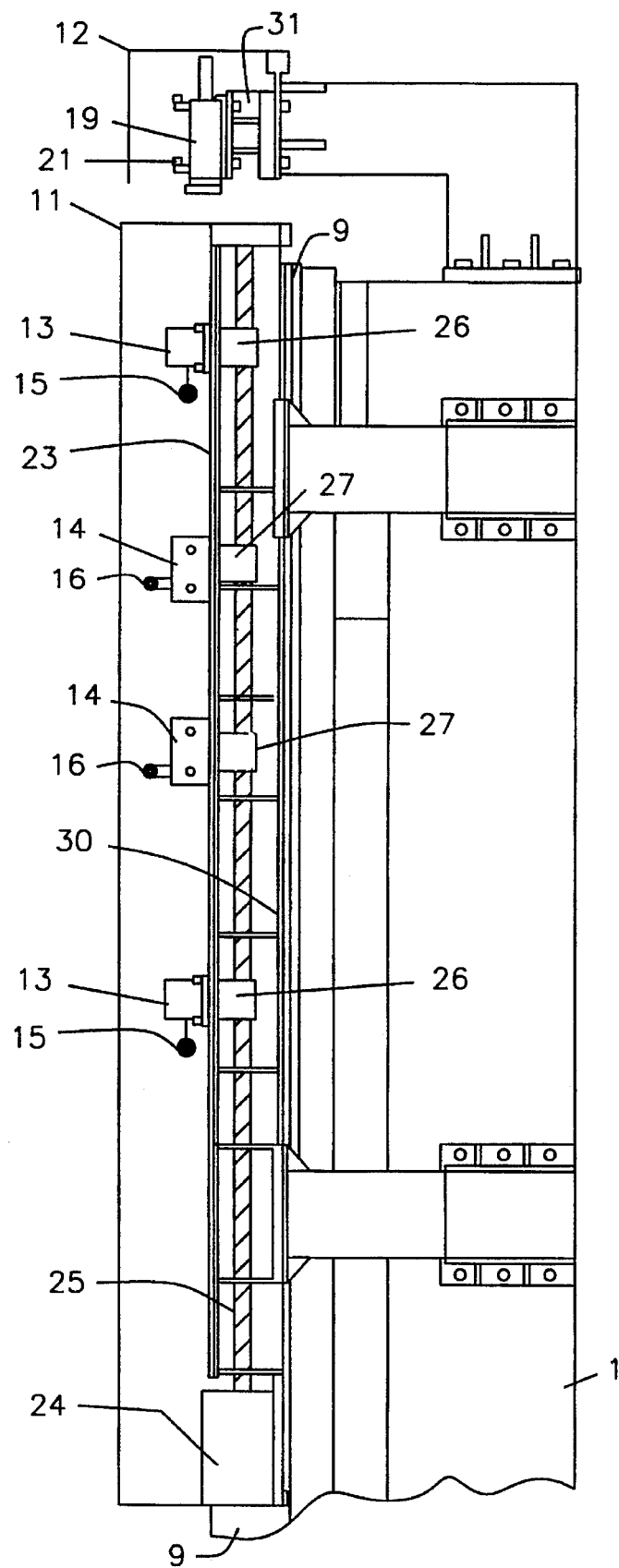
FIG. 7 shows a side view of the rule stopper apparatus in FIG. 6.

Referring to the other embodiment of FIGS. 6 and 7, the construction of the rule stoppers 19 of the rule stopper apparatus 12 and the contact confirming limit switches 13 and 14 are same as the above construction of FIGS. 2–4. In the present embodiment, the rule stoppers 13 for positioning the sacrifice board and the rule stoppers 14 for positioning the process board can be moved on rails 23 attached to the stopper holder 30. A servomotor 24 is fixed on the stopper holder 30 at one end of the rails 23, a screw shaft 25 is connected to the rotary shaft of the servomotor 24 and clutches 26 and 27 fixed under the rule stoppers 13 and 14 are engaged with the screw shaft 25.

In the rule stopper apparatus in the embodiment, when the clutchs 26 of the rule stoppers 13 are operated and engaged with the screw shaft 25 and the servomotor 24 is driven, the rule stoppers 13 are slid on the rails 23 and the distances of the rule stoppers 13 are suitably set according to the length of the sacrifice board. Also, when the clutches 27 of the rule stoppers 14 are operated and engaged with the screw shaft 25 and the servomotor 24 is driven, the rule stoppers 14 are slid on the rails 23 and the distances of the rule stoppers 14 are suitably set according to the length of the process board.

When movement of the rule stoppers 13 and 14 interfere with each other, the rule stoppers 13 and 14 are engaged with the screw shaft 25 and are moved at the same time, whereby the interference between the rule stoppers 13 and 14 is protected.

In addition to the above embodiment, two male screw shafts are rotatably provided with the stopper holder 31, are severally coupled with two servomotors fixed to both ends of the stopper holder and engage with female screws of two rule stoppers 13 for the sacrifice board and two rule stoppers 14 for the process board in suitable distances severally. In the embodiment, when the servomotors are rotated, the positions of the rule stoppers 13 and 14 are changed.

As stated above, in the positioning rule stopper apparatus, because the rule stoppers for the sacrifice board and the process board are mounted to be moved near the short and long edges of the table, even if the sacrifice board and the process board are long, the sacrifice board and the process board can be precisely positioned on the table because the distances between the rule stoppers are changed suitably.

What is claimed is:

1. A positioning rule stopper apparatus for use in a numerical control router, comprising:

a supporting bed;

a first rail mounted on the supporting bed;

a second rail mounted on the supporting bed and oriented at a right angle to said first rail;

a head structure provided with a process head having a motor with a rotary shaft on which a tool can be fixed, said head structure being movably mounted on the first rail;

a suction table mounted on the second rail for holding a sacrifice board and a process board on the sacrifice board, said suction table being movable on said second rail at a right angle to movement of the head structure on the first rail, said suction table having at least one short outer side and at least one long outer side;

a first stopper holder fixed to the supporting bed at one short outer side of the suction table;

a plurality of first rule stoppers for the sacrifice board and the process board in common;

first cylinder means mounted on said first stopper holder for moving said rule stoppers to position one side of the sacrifice board and the process board with respect to the suction table;

first confirming contact limit switches mounted on the first rule stoppers for confirming the position of said one side of the sacrifice board and the process board;

a second stopper holder fixed to the supporting bed at one longer outer side of the suction table;

a plurality of second rule stoppers for the sacrifice board;

second cylinder means mounted on said second stopper holder for moving said second rule stoppers to position another side of the sacrifice board with respect to the suction table; and second confirming contact limit switches engaged with the second rule stoppers for confirming the position of said another side of the sacrifice board;

a plurality of third rule stoppers for the process board;

third cylinder means mounted on said second stopper holder for moving said third rule stoppers to position another side of the process board with respect to the suction table; and third confirming contact limit switches engaged with the third rule stoppers for confirming the position of said another side of the process board; and said second cylinder means and said third cylinder means are alternately mounted on the second stopper holder at different heights.

2. A positioning rule stopper apparatus according to claim 1, wherein:

said second cylinder means is slidably mounted on said second stopper holder for moving said second rule stoppers to position said another side of the sacrifice board with respect to the suction table; and said third cylinder means is slidably mounted on said second stopper holder for moving said third rule stoppers to position another side of the process board with respect to the suction table.

3. A positioning rule stopper apparatus according to claim 2, further comprising:

a rotary shaft mounted to the second stopper holder;

a servomotor engaging with the rotary shaft for rotating said rotary said rotary shaft; and a plurality of clutches attached to the second cylinder means and the third cylinder means and engaged with the rotary shaft for moving the second cylinder means and the third cylinder means along said long outer side of said suction table.

\* \* \* \* \*